Jan. 9, 1968 V. R. NILSSON 3,362,218
FORCE MEASURING MEANS
Filed April 5, 1965 2 Sheets-Sheet 1
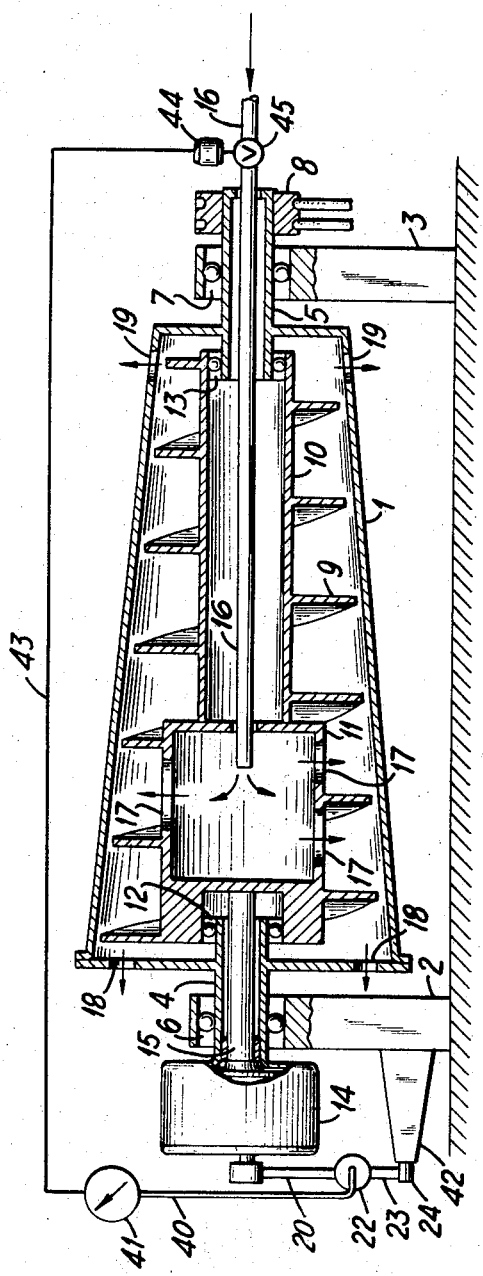
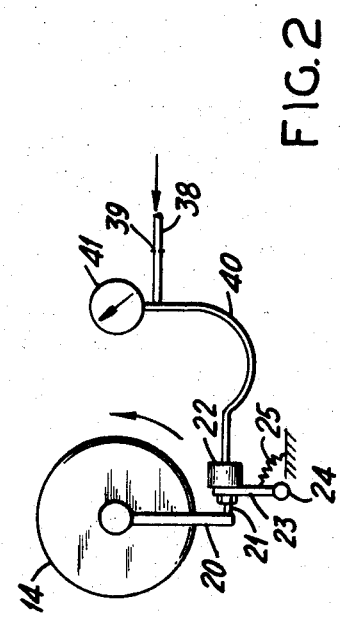
INVENTOR.
VILGOT RAYMOND NILSSON
BY
Davis, Hoxie, Faithfull & Hapgood
ATTORNEYS.

Jan. 9, 1968  V. R. NILSSON  3,362,218

FORCE MEASURING MEANS

Filed April 5, 1965 2 Sheets-Sheet 2

INVENTOR.
VILGOT RAYMOND NILSSON
BY
*Davis, Hoxie, Faithfull & Hapgood*
ATTORNEYS.

United States Patent Office 3,362,218
Patented Jan. 9, 1968

3,362,218
FORCE MEASURING MEANS
Vilgot Raymond Nilsson, Hagersten, Sweden, assignor to Alfa-Laval AB, Tumba, Sweden, a corporation of Sweden
Filed Apr. 5, 1965, Ser. No. 445,599
Claims priority, application Sweden, Apr. 17, 1964, 4,726/64
3 Claims. (Cl. 73—136)

ABSTRACT OF THE DISCLOSURE

A pneumatic pressure line is connected to the inlet of a casing and is adapted to communicate with an outlet of the casing by way of an annular valve seat having an inner diameter substantially larger than the inlet diameter, the seat having a soft, resilient sealing surface. A valve body in the casing is movable toward this sealing surface to throttle the air flow, and a pin secured to the valve body extends out of the casing with a close sliding fit in a guiding means located at the side of the valve body remote from the inlet, so that an increasing force on the other end of the pin increases the throttling and thus the pressure in the line. Preferably, the surface of the pin which slides in the guiding means has at least one recess for receiving a lubricant, and a channel in the pin leading from the inlet side of the valve body opens through the sliding surface adjacent the recess. The outer end of the pin may be engaged by a member associated with the driving means for rotating the sludge discharge screw of a sludge centrifuge, whereby the pin is pressed with a force proportional to the resistance of the sluge to rotation of the screw.

---

This invention relates to force measuring means of the pneumatic type and particularly to improved means of this type which are suitable for measuring the torque generated by the scraper of a sludge centrifuge, although the invention is not limited to such use.

Continuously operating sludge centrifuges are commonly provided with a scraping member concentric to the centrifuge rotor and rotatable in relation to the rotor, the scraping member being arranged to convey the sludge towards an outlet. It is known in the art to provide such centrifuges with a measuring instrument which continuously indicates the torque of the scraping member. The measuring impulses in the instrument are caused to actuate automatically a means which controls the supply to the centrifuge of the material to be treated. British patent specification 428,188 discloses a mechanical transmission of the measuring impulses to the control means. This control of the supply is, however, subjected to such amplitudes of oscillation that the throughput of the centrifuge must be kept comparatively low for reliable operation, and the same is true if the measuring impulses are hydraulically transmitted to the control means.

According to the present invention, it is possible to multiply (e.g. five times) the throughput of the centrifuge by providing a sensitive and quick-acting measuring instrument for the torque of the scraping member so that the amplitudes of oscillation are small.

The present invention can be used not only in connection with the above-mentioned problem but also for other applications where an accurate measurement of force is required, as for weighing operations.

The force measuring means of the present invention comprises a casing having an inlet which communicates with a source of pneumatic pressure and also having an outlet which is in open communication with the atmosphere. The inlet connection is constituted by a pipe having an inner diameter which is considerably smaller than the inner diameter of a valve seat provided with a sealing surface of a soft, resilient material and with which a valve body interacts. The valve body has a pin extending out of the casing and provided with a sealed sliding fit through the wall of the valve casing, the outer end of the pin serving to sense the force to be measured.

The source of pneumatic pressure is preferably a compressed air pump, and the air which reaches the valve seat presses the valve body away from the seat against the action of the force to be measured. In this way, the valve body will, so to speak, rest on an air cushion, the pressure of which is determined by the magnitude of the force to be measured. The variations of the air pressure represent variations in the force being measured.

According to a preferred embodiment of the invention, the outlet to the atmosphere is constituted by holes arranged in the casing wall. Also, the sealing surface is preferably formed by a ring with a circular cross section. In order to ensure that the ring does not become worn too rapidly, it is preferable that the valve body be arranged so as to abut tangentially with its sealing surface against the surface of the sealing ring.

A further expedient for causing the measuring means of the invention to work with a high sensitivity consists in providing one or more recesses, for the reception of lubricant, in the sliding surface of the valve body pin which extends out of the casing. In order to ensure a satisfactory distribution of the lubricant, a channel is provided which extends from the inlet side of the casing through the valve body to the sliding surface near the recess or recesses. Compressed air, for instance, is forced through this channel to the sliding surface of the pin and spreads the lubricant by leakage along the sliding surface. A suitable distribution of the lubricant is obtained by providing two recesses extending peripherally in the sliding surface of the pin and by arranging the channel to open through the sliding surface between these recesses.

For obtaining a sensitive detection of force, it is desirable that the outer end of the pin be formed by a body of wear-resistant plastic so that the friction of the force-transmitting member against the outer end of the pin is reduced.

The measuring means of the invention has given very good results when used as a measuring instrument indicating continuously the torque generated by a scraping member which is concentric to the rotor in a continuously operating sludge centrifuge and is rotatable in relation to the rotor so as to convey the sludge towards a sludge outlet. As mentioned earlier, the throughput of the centrifuge can be multiplied in this way.

The invention is described more in detail in the following, reference being made to the attached drawings in which:

FIG. 1 is a longitudinal sectional view of a sludge centrifuge apparatus embodying a preferred form of the invention;

FIG. 2 is an end view of the apparatus illustrated in FIG. 1, showing further details of the force measuring means and the element of the centrifuge acting on such means;

Figure 3:
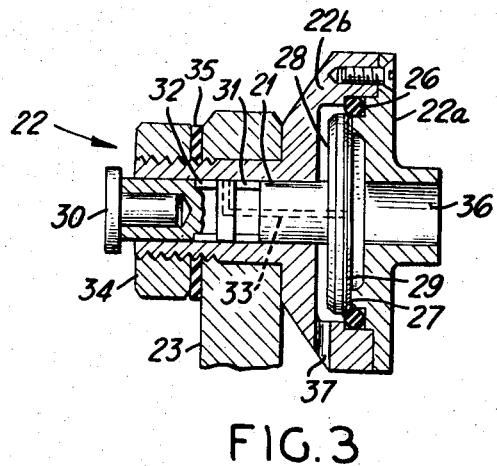
FIG. 3 is a longitudinal sectional view, on an enlarged scale, of the force measuring means shown in FIG. 1.

In FIG. 1, reference numeral 1 designates a conical rotor and reference numerals 2 and 3 designate frames in which the rotor is journalled by means of hollow shaft pivots 4 and 5 in bearings 6 and 7. The rotor is driven by a belt pulley 8. The rotor is provided internally with a conveyor screw 9 having a corresponding conicity and mounted concentrically to the axis of rotation of the rotor. The screw is arranged on a hollow shaft which consists of a narrower part 10 and a wider part 11. The latter is arranged at the wider end of the screw. Thus, the radial extension of the impeller blades at the wider end is reduced so that the impeller blades, in spite of the increasing width of the screw, keep the rigidity required. The shaft 10–11 is journalled by means of the bearings 12 and 13 on the shaft pivots 4 and 5. The casing 14 of planetary gearing is firmly secured to the left-hand end of the shaft pivot 4. The centrifuge rotor and the gear casing 14 will thus rotate together at the same speed. The planetary gearing is provided with an output shaft 15 which is firmly secured to the screw shaft 10–11. The planetary gearing causes the shaft 15 to rotate at a lower speed than the rotor 1, the speed difference being preferably 15 to 20 r.p.m. Thus, the screw 9 will rotate relative to the rotor 1. A sludge-containing liquid to be separated is fed through a pipe 16 which is concentric to the axis of rotation of the centrifuge. Pipe 16 opens inside the shaft part 11, from where the liquid is ejected through openings 17 in the shaft wall into the rotor 1 where it is separated. The separated liquid is discharged through overflows 18 in the end wall at the wider end of the rotor, while the separated sludge is conveyed by the screw 9 above the liquid level and ejected through openings 19 in the rotor wall at the narrower end of the rotor.

Figure 4:
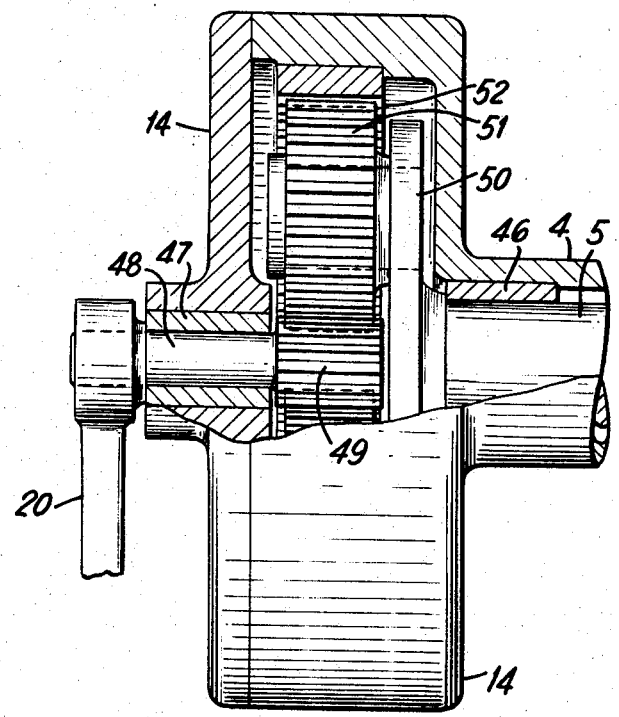
FIG. 4 is an enlarged side elevational view, partly in section, of the planetary gearing shown in FIG. 1 and through which the centrifuge scraper exerts a force on the measuring means.

Referring to FIG. 4, a bearing 46 supports shaft 15 in the hollow shaft 4, and a bearing 47 supports a central shaft 48 in the gear casing 14. The central shaft 48 is secured to a sun gear 49 within the casing. A planetary gear holder 50 is secured to shaft 15 and carries planetary gears of which one is shown at 51. Each planetary gear 51 meshes with the sun gear 49 and with a toothed rim or ring 52 secured to the inside of gear casing 14 at its peripheral portion. Thus, when sun gear 49 is held stationary, rotation of the rotor shaft 4 causes gear holder 50, shaft 15 and screw 9 to rotate in the same direction but at lower speed; and the torque exerted on sun gear shaft 49 is directly proportional to the resistance imposed by the sludge to rotation of the screw 9.

A lever 20 is secured to the sun gear shaft 48 and, as shown in FIG. 2, is retained so as to be prevented from rotating together with the gear casing 14 under normal load on the screw 9. More particularly, the lever 20 presses against a pin 21 of a force measuring device shown generally at 22, this device being secured to a lever 23. The latter can rock around a fulcrum 24, but a compression spring 25 normally prevents the device 22 and lever 23 from being rocked by the lever 20. It is only when the pressure from the lever 20 exceeds a preset release value that the lever 23 yields against the action of spring 25 and rocks to the right-hand side where it is retained in the released position by a catch (not shown). The lever 20 and consequently the screw 9 will then rotate at the same speed as the rotor 1, that is, together with the rotor. The measuring device 22 and lever 23 are not restored to their operating positions, as shown in FIG. 2, until the centrifuge has stopped.

As shown in FIG. 3, the force measuring means or device 22, supported by the lever 23, comprises a casing consisting of two halves 22a and 22b screwed to each other. A ring 26, which has a circular cross section and serves as sealing surface on a valve seat 27, is inserted between the halves 22a–22b. The valve seat interacts with a valve disc 28 provided with an edge 29 which is bevelled so that that the edge abuts tangentially against the ring 26. The valve disc, by means of cylindric pin 21, is guided in a corresponding cylindrical hole in the casing half 22b. A pin 30 of wear-resistant plastic is forced into a cylindrical hole in the outer end of the pin 21 and serves to take up the abutting pressure from the lever 20. The sliding surface of the pin 21 is provided with two peripherally running recesses 31 and 32, and between these recesses a channel 33 opens into the sliding surface, this channel extending into the pin from that side of the valve disc 28 which faces the valve seat 27. The casing 22a–22b is secured to the lever 23 by a nut 34. A packing 35 is inserted between nut 34 and the lever 23. The casing 22a–22b is further provided with an inlet 36 and peripherally distributed outlet holes 37.

A source of compressed air (not shown) at a constant pressure is connected to the inlet 36 by means of a pipe 38 (FIG. 2) in which is fitted a fixed throttle 39. Thus, to the right of the throttle 39 a constant pressure prevails. The pipe 38 is in its turn connected to the inlet 36 by a hose 40. The compressed air presses the valve disc 28 (FIG. 3) to the left against the action of the force with which the lever 20 presses against the pin 30. The air which flows out between the ring 26 and the disc 28 escapes into the atmosphere through the holes 37. If the force which acts upon the pin 30 from lever 20 is increased, the slit between the ring 26 and the valve disc 28 is throttled and, consequently, the pressure at the right of the valve disc increases. This pressure increase is transmitted through the hose 40 from the casing inlet 36 to a pressure gauge 41 (FIGS. 1 and 2).

As shown in FIG. 1, a bracket 42 extends from the frame 2 and supports the fulcrum 24. A servo-line 43 (for example, of the electric, hydraulic or pneumatic type) automatically transmits the deflection of the pressure gauge 41 to an electric motor 44 which adjusts a valve 45 in the liquid-supply line 16. In this way, the quantity of liquid fed into the centrifuge is always such that the quantity of sludge supplied to the centrifuge per unit of time remains constant.

I claim:

1. A force measuring device comprising a casing having an inlet, a pneumatic pressure line connected to said inlet, the casing also having an outlet opening to atmosphere, an annular valve seat in the casing through which said inlet is adapted to communicate with said outlet, said valve seat having an inner diameter substantially larger than the diameter of said inlet and having a sealing surface of soft, resilient material, a valve body in the casing coacting with said sealing surface and movable toward said surface to effect throttling of the air flow between said inlet and outlet, the casing having a guiding means at the side of the valve body remote from said inlet, a pin secured to the valve body and extending out of the casing with a close sliding fit in said guiding means, whereby increase in a force on the outer end of the pin increases said throttling and thus increases the pressure in said line, and means connected to said line and responsive to pressure variations in the line, said pin having a sliding surface slidable in said guiding means and provided with a recess for receiving a lubricant, the pin having a channel opening through said sliding surface adjacent said recess and leading from the inlet side of said valve body.

2. A force measuring device comprising a casing having an inlet, a pneumatic pressure line connected to said inlet, the casing also having an outlet opening to atmosphere, an annular valve seat in the casing through which said inlet is adapted to communicate with said outlet, said valve seat having an inner diameter substantially larger than the diameter of said inlet and having a sealing surface of soft, resilient material, a valve body in the casing coacting with said sealing surface and movable toward said surface to effect throttling of the air flow between said inlet and outlet, the casing having a guiding means at the side of the valve body remote from said inlet, a pin secured to the valve body and extending out of the casing with a close sliding fit in said guiding means, whereby increase in a force on the outer end of the pin increases said throttling and thus increases the pressure in said line, and means connected to said line and responsive to pressure variations in the line, said pin having a sliding surface slidable in said guiding means and provided with two recesses for receiving a lubricant, the pin having a channel opening through said sliding surface between said recesses and leading from the inlet side of said valve body.

3. A force measuring device comprising a casing having an inlet, a pneumatic pressure line connected to said inlet, the casing also having an outlet opening to atmosphere, an annular valve seat in the casing through which said inlet is adapted to communicate with said outlet, said valve seat having an inner diameter substantially larger than the diameter of said inlet and having a sealing surface of soft, resilient material, a valve body in the casing coacting with said sealing surface and movable toward said surface to effect throttling of the air flow between said inlet and outlet, the casing having a guiding means at the side of the valve body remote from said inlet, a pin secured to the valve body and extending out of the casing with a close sliding fit in said guiding means, whereby increase in a force on the outer end of the pin increases said throttling and thus increases the pressure in said line, and means connected to said line and responsive to pressure variations in the line, said device being in combination with a sludge centrifuge having a rotor, a rotary screw in the rotor for discharging separated sludge therefrom, and means for driving said rotor and screw at different speeds to effect said discharge, the driving means including a member pressing against said outer end of the pin with a force proportional to the resistance of said sludge to rotation of the screw.

References Cited
UNITED STATES PATENTS

| | | |
|---|---|---|
| 3,108,649 | 10/1963 | Hamilton _____ 73—141 XR |
| 3,164,333 | 1/1965 | Robertson. |
| 3,165,933 | 1/1965 | Levitt. |
| 3,234,786 | 2/1966 | Christenson et al. __ 73—141 XR |

FOREIGN PATENTS 657,713   3/1938   Germany.

RICHARD C. QUEISSER, *Primary Examiner.*

C. A. RUEHL, *Assistant Examiner.*